(12) United States Patent
Schneider et al.

(10) Patent No.: US 10,385,251 B2
(45) Date of Patent: Aug. 20, 2019

(54) COMPOUNDS, COMPLEXES, COMPOSITIONS, METHODS AND SYSTEMS FOR HEATING AND COOLING

(71) Applicant: University of Notre Dame du Lac, Notre Dame, IN (US)

(72) Inventors: William F. Schneider, Notre Dame, IN (US); Joan F. Brennecke, Notre Dame, IN (US); George Mozurkewich, Albuquerque, NM (US); Mark J. McCready, Notre Dame, IN (US); Edward J. Maginn, Notre Dame, IN (US); Brandon L. Ashfeld, Notre Dame, IN (US); Mark Stadtherr, Notre Dame, IN (US)

(73) Assignee: UNIVERSITY OF NOTRE DAME DU LAC, Notre Dame, IN (US)

(*) Notice: Subject to any disclaimer, the term of this patent is extended or adjusted under 35 U.S.C. 154(b) by 0 days.

(21) Appl. No.: 15/026,233

(22) PCT Filed: Sep. 30, 2014

(86) PCT No.: PCT/US2014/058366
§ 371 (c)(1),
(2) Date: Mar. 30, 2016

(87) PCT Pub. No.: WO2015/048765
PCT Pub. Date: Apr. 2, 2015

(65) Prior Publication Data
US 2016/0237333 A1    Aug. 18, 2016

Related U.S. Application Data

(60) Provisional application No. 61/884,334, filed on Sep. 30, 2013.

(51) Int. Cl.
| | |
|---|---|
| *C09K 5/04* | (2006.01) |
| *C09K 5/16* | (2006.01) |
| *F25B 13/00* | (2006.01) |
| *F25B 9/00* | (2006.01) |

(52) U.S. Cl.
CPC ............... *C09K 5/16* (2013.01); *C09K 5/041* (2013.01); *F25B 13/00* (2013.01); *F25B 9/008* (2013.01); *F25B 2309/06* (2013.01)

(58) Field of Classification Search
CPC .......... C09K 5/047; C09K 5/041; C09K 5/08; C09K 5/10; C09K 2205/106; F25B 13/00; F25B 9/008
USPC .......................... 252/69, 67, 68; 62/502, 529
See application file for complete search history.

(56) References Cited

U.S. PATENT DOCUMENTS

| | | | |
|---|---|---|---|
| 4,621,089 A | 11/1986 | Ward | |
| 4,837,238 A | 6/1989 | Markwell | |
| 5,228,897 A | 7/1993 | Korte | |
| 6,329,342 B1 | 12/2001 | Kauffman | |
| 6,415,614 B1 | 7/2002 | Greenfield et al. | |
| 6,579,343 B2 | 6/2003 | Brennecke et al. | |
| 6,639,076 B1 | 10/2003 | Hauser | |
| 7,053,232 B2 | 5/2006 | Moulton | |
| 8,142,680 B2* | 3/2012 | Rached | C07C 19/08 252/67 |
| 2005/0129598 A1 | 6/2005 | Chinn et al. | |
| 2005/0131118 A1 | 6/2005 | Moulton et al. | |
| 2006/0197053 A1 | 9/2006 | Shiflett et al. | |
| 2006/0211678 A1 | 9/2006 | Ahmed | |
| 2007/0144186 A1 | 6/2007 | Shiflett et al. | |
| 2007/0295478 A1 | 12/2007 | Schiflett et al. | |
| 2008/0028777 A1 | 2/2008 | Boesmann et al. | |
| 2009/0005410 A1 | 1/2009 | Charvat | |
| 2009/0042910 A1 | 2/2009 | Jung | |
| 2009/0137580 A1 | 5/2009 | Imamura | |
| 2009/0325956 A1 | 12/2009 | Taniguchi | |
| 2010/0044620 A1 | 2/2010 | Rached | |
| 2010/0152159 A1 | 6/2010 | Mitchell | |
| 2010/0154419 A1* | 6/2010 | Kontomaris | C09K 5/047 60/645 |
| 2010/0200799 A1* | 8/2010 | Mouli | A62D 1/0057 252/68 |
| 2010/0243948 A1* | 9/2010 | Leck | C09K 5/045 252/68 |
| 2011/0005723 A1* | 1/2011 | Mouli | A62D 1/0057 165/104.21 |
| 2011/0126563 A1 | 6/2011 | Tang et al. | |
| 2012/0134905 A1 | 5/2012 | Kalb | |
| 2012/0204717 A1 | 8/2012 | Dinnage | |
| 2012/0222557 A1 | 9/2012 | Schneider et al. | |
| 2013/0058852 A1 | 3/2013 | Atkins et al. | |

FOREIGN PATENT DOCUMENTS

| | | |
|---|---|---|
| EP | 0850933 | 7/1998 |
| EP | 1880754 | 1/2008 |

(Continued)

OTHER PUBLICATIONS

Gurkan et al., "Molecular Design of High Capacity, Low Viscosity, Chemically Tunable Ionic Liquids for C02 Capture", The Journal of Physical Chemistry Letters. Dec. 3, 2010. 1(24):3494-3499.

(Continued)

*Primary Examiner* — Douglas J McGinty
(74) *Attorney, Agent, or Firm* — Michael Best & Friedrich LLP

(57) ABSTRACT

Disclosed herein are ionic liquid compounds, complexes and compositions suitable for use as refrigerants. Methods and systems for heating and/or cooling, including vapor compression heating or cooling systems, including such refrigerants are also disclosed. Preferred ionic liquids include those having anions selected from pyrrolide, pyrazolide, triazolide, imidazolide, benzimidazolide, and indolide, and cations selected from phosphonium, ammonium, pyrrolidinium, imidazolium, and pyridinium.

13 Claims, 8 Drawing Sheets

(56) References Cited

FOREIGN PATENT DOCUMENTS

| EP | 1950271 | 7/2008 |
|---|---|---|
| WO | WO 2005/113496 | 12/2005 |
| WO | WO 2008/044767 | 4/2008 |
| WO | WO 2008/124042 | 10/2008 |
| WO | WO 2010/023413 | 3/2010 |
| WO | 2011/056895 A1 | 5/2011 |
| WO | 2015/069799 A1 | 5/2015 |

OTHER PUBLICATIONS

International Search Report and Written Opinion issued in application No. PCT/US2014/058366 dated Jan. 16, 2015.
International Search Report and Written Opinion issued in application No. PCT/US2010/055330 dated Feb. 18, 2011.
International Search Report and Written Opinion issued in application No. PCT/US2014/064172 dated Feb. 12, 2015.
Martin et al., "Thermodynamic analysis of absorption refrigeration cycles using ionic liquid+supercritical C02 pairs.", The Journal of Supercritical Fluids, 55(2):852-859 (2010).
Steinbach et al., "Labeling of Aromatic Compounds with Carbon-11 in Ring Position", Synthesis and Applications of Isotopically Labelled Compounds, Proceedings of the International Symposium, $7^{th}$, Dresden Germany Jun. 18-22, 2000.
Wang et al., "Carbon Dioxide Capture by Superbase-Derived Protic Ionic Liquids", Angewandte Chemie, International Edition, Coden: ACIEF5, 49(34):5978-5981 (Aug. 9, 2010).

\* cited by examiner

ΔH in kJ/mol and C-O distance in Å

ΔH in kJ/mol and C-O distance in Å

4,5-dichloro imidazole    4,5-dicyano imidazole    2-ethyl, 4-methyl imidazole    2-methyl, 4-nitro imidazole −26                       −15                      −80                            −39 (−22)

COMPOUNDS, COMPLEXES, COMPOSITIONS, METHODS AND SYSTEMS FOR HEATING AND COOLING

STATEMENT OF GOVERNMENT INTEREST

This invention was made with government support under Award No. DE-AR0000119 awarded by the Department of Energy. The government has certain rights in the invention.

BACKGROUND OF THE INVENTION

Hydrofluorocarbon (HFC) refrigerants such as 134a have long been used to provide cooling using vapor compression cycles. However, these and many other commonly used refrigerants have deleterious environmental effects. Carbon dioxide, on the other hand, provides a much more environmentally friendly option for vapor compression cooling and heating. However, the pressures required to incorporate $CO_2$ in existing vapor compression systems, and the inefficiency of these systems have slowed the transition from HFC refrigerant based systems to $CO_2$ based vapor compression cooling systems. Accordingly, there remains a need for environmentally friendly and efficient cooling systems. Embodiments disclosed herein are designed to address these needs, and provide additional benefits to the heating and cooling industry.

SUMMARY OF THE INVENTION

In some embodiments, there is provided compounds, complexes and compositions comprising an ionic liquid (IL) and $CO_2$, which are suitable for use in methods and systems for heating and/or cooling.

In some embodiments, there is provided a method for identifying an ionic liquid that is suitable for use in a vapor compression heating or cooling system.

In some embodiments, there is provided a vapor compression system, which utilizes an ionic liquid and $CO_2$ refrigerant mixture.

In some embodiments, there is provided a co-fluid comprising an ionic liquid and $CO_2$.

In some embodiments, the methods and systems disclosed herein combine efficiency and low GWP (global warming potential) of $CO_2$ cycles with low operating pressures of conventional cycles.

In some embodiments, there is provided a method for cooling an enclosed space. In some embodiments, there is provided a method for heating an enclosed space.

In some embodiments, there is provided a system that provides cooling by compressing a mixture of an ionic liquid and $CO_2$, cooling the mixture, lowering the pressure of the mixture, and contacting an enclosed space with the mixture.

In some embodiments, the systems utilize a single compression device. In some embodiments, the single compression device is a co-compression device. In some embodiments, the systems disclosed herein utilize a plurality of compression devices wherein the gas and liquid are not in the same compression device. In some embodiments the compression device is designed specifically for the compounds, complexes and compositions described herein.

In some embodiments, the device has an entrance geometry, which maximizes the contact between the ionic liquid and $CO_2$. In some embodiments, the device has an entrance geometry that permits the ionic liquid and $CO_2$ to be in close thermal equilibrium during the compression step.

In some embodiments, there is provided a system, which is designed to ensure that the gas to liquid ratio is optimized just before expansion.

In some embodiments noted above and elsewhere herein, at least a portion of the composition comprising an ionic liquid and $CO_2$ may be replaced by a composition wherein the anion of the ionic liquid has a $CO_2$ substituent bound thereto. In some embodiments, the composition comprising an ionic liquid and $CO_2$ may be alternatively described as a composition comprising an liquid in which the anion of the ionic liquid has a $CO_2$ substituent bound thereto

DETAILED DESCRIPTION OF THE PREFERRED EMBODIMENTS

Figure 1:
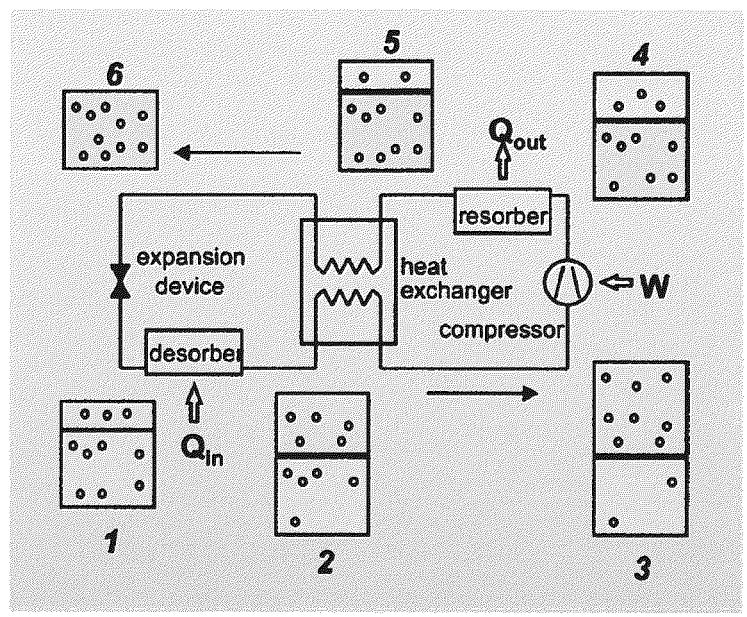
FIG. 1 is a schematic of a compression cooling system.

One skilled in the art will appreciate that any of the ionic liquids described herein can be used in any of the complexes, compounds, compositions, methods or systems described herein.

In some embodiments, there is provided compounds, complexes and compositions comprising an ionic liquid and $CO_2$, which are suitable for use in methods and systems for heating and/or cooling. In some embodiments, there is provided compounds, complexes and compositions comprising an ionic liquid and $CO_2$, which are suitable for use in methods and systems for vapor compression heating and/or cooling.

In some embodiments, there is provided a method for identifying an ionic liquid that is suitable for use in a vapor compression heating or cooling system.

In some embodiments, there is provided a vapor compression system, which utilizes an ionic liquid and $CO_2$ refrigerant mixture.

In some embodiments, there is provided a co-fluid comprising an ionic liquid and $CO_2$.

In some embodiments, the methods and systems disclosed herein combine efficiency and low GWP of $CO_2$ cycles with low operating pressures of conventional cycles.

In some embodiments, the ionic liquids that are suitable for use in the systems and methods disclosed herein are identified by their ability/inability to physically uptake $CO_2$ or chemically interact with $CO_2$.

In some embodiments, the ionic liquids that are suitable for use in the systems and methods disclosed herein demonstrate the ability to physically uptake $CO_2$ and also chemically bind $CO_2$.

In some embodiments, there is provided a method for identifying an ionic liquid that is suitable for use in a vapor compression heating or cooling system (e.g., a heat pump).

In some embodiments, there is provided a method for identifying an ionic liquid that is suitable for use in a vapor compression cooling system.

In some embodiments, the ionic liquids suitable for use in the systems and methods described herein, exhibit some chemical affinity for $CO_2$. In some embodiments, the ionic liquids suitable for use in the systems and methods disclosed herein demonstrate a downward curvature in their isothermal $CO_2$ uptake with pressure plots.

In some embodiments, the isotherm curvature is a signature for formation of a chemical association or chemical bond between $CO_2$ and the ionic liquid. In some embodiments, the magnitude of the isotherm curvature is a measure of the strength, or enthalpy, of that chemical bond. The strength of the chemical bond can be measured in various ways in the laboratory and can also be estimated computationally.

In some embodiments, the ionic liquids that are suitable for use in the methods and systems disclosed herein have a $CO_2$ binding enthalpy of from about (–)20 kJ/mol to about (–)40 kJ/mol. In some embodiments, the ionic liquids that are suitable for use in the methods and systems disclosed herein have a $CO_2$ binding enthalpy of from about (–)25 kJ/mol to about (–)35 kJ/mol.

In some embodiments, the ionic liquids that are suitable for use in the methods and systems disclosed herein comprise an anion that is able to provide a $CO_2$ binding enthalpy of from about (–)20 kJ/mol to about (–)40 kJ/mol. In some embodiments, the ionic liquids that are suitable for use in the methods and systems disclosed herein comprise an anion selected from azolide, phenoxide, alkoxide, and carboxylate.

In some embodiments, the ionic liquids suitable for use in the methods and systems disclosed herein include one or more substituents on the anion selected from cyano, fluoro, chloro, nitro, alkyl, carbaldehyde and trifluoromethyl. In some embodiments, the substituent is selected based on its ability to provide a $CO_2$ binding enthalpy of from about (–)20 kJ/mol to about (–)40 kJ/mol.

In some embodiments, the ionic liquid anion suitable for use in the complexes, compositions, methods and systems disclosed herein comprises an azolide, or aprotic heterocyclic anion (AHA), including, but not limited to, those represented by Formulas I, II, Ia, and IIa below. In some embodiments, the ionic liquid anion suitable for use in the complexes, compositions, methods and systems disclosed herein is selected from pyrrolide, pyrazolide, imidazolide, triazolide, benzimidazolide, and indolide. In some embodiments, the ionic liquid anion selected from pyrrolide, pyrazolide, imidazolide, triazolide, benzimidazolide, and indolide includes one or more substituents selected from alkyl, cyano, fluoro, chloro, nitro, and trifluoromethyl. In some embodiments, the ionic liquid anion comprises 4-nitropyrazolide.

In some embodiments, the ionic liquid anion suitable for use in the complexes, compositions, methods and systems disclosed herein comprises a phenoxide anion and an one or more substituents selected from alkyl, cyano, fluoro, chloro, nitro, and trifluoromethyl. In some embodiments, the ionic liquid suitable for use in the complexes, compositions, methods and systems comprises a carboxylate (e.g., acetate or lactate) anion.

In some embodiments, the ionic liquid suitable for use in the complexes, compositions, methods and systems disclosed herein comprises an alkoxide (e.g., methoxide or t-butoxide) anion and one or more substituents selected from alkyl, cyano, fluoro, chloro, nitro, ester, and trifluoromethyl.

In some embodiments, the ionic liquid suitable for use in the complexes, compositions, methods and systems disclosed herein possesses a cation selected from phosphonium, ammonium, pyrrolidinium, imidazolium, thiouronium, thiolanium, thiophenium, sulfonium, and pyridinium. In some embodiments, the ionic liquid suitable for use in the complexes, compositions, methods and systems possesses a phosphonium cation.

Ionic liquids for use in the compositions and methods disclosed herein include those disclosed in WO 2011/056895, which is hereby incorporated by reference in its entirety. Certain preferred ionic liquids comprise an anion represented by a formula (I):

(I)

wherein X is N; A is N or CH; E is N or CH; and $R^1$ and $R^2$ are independently H, fluoro, chloro, bromo, ester, CN, CHO, $NO_2$, $CF_3$, or $C_{1-6}$ hydrocarbyl. In certain preferred embodiments, none or one or both of $R^1$ or $R^2$ is a substituent other than H. In some preferred embodiments, $R^1$ and $R^2$ are independently H, fluoro, chloro, bromo, $NO_2$, CHO, or methyl. In some preferred embodiments, $C_{1-6}$ hydrocarbyl is methyl, and in others it can be methyl and/or ethyl.

Other preferred ionic liquids comprise an anion represented by the formula (II):

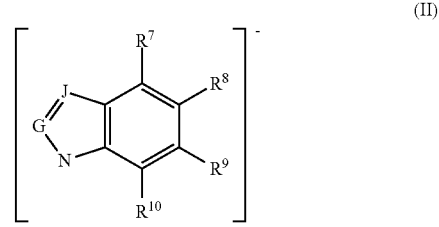

(II)

wherein G is CH; J is CH; and $R^7$, $R^8$, $R^9$, and $R^{10}$ are independently H, fluoro, chloro, bromo, ester, CN, CHO, $NO_2$, $CF_3$, or $C_{1-6}$ hydrocarbyl. In certain preferred embodiments none or one of $R^7$, $R^8$, $R^9$, or $R^{10}$ is a substituent other than H. In some preferred embodiments, $R^7$, $R^8$, $R^9$, and $R^{10}$ are independently H, fluoro, chloro, bromo, $NO_2$, CHO, or methyl. In some preferred embodiments, $C_{1-6}$ hydrocarbyl is methyl, and in others it can be methyl and/or ethyl.

In other embodiments, preferred ionic liquids comprise an anion according to formula (Ia), wherein X is N, A is N, N—$CO_2$, or CH; E is N, N—$CO_2$, or CH; and $R^1$ and $R^2$ are independently H, fluoro, chloro, bromo, ester, CN, CHO, $NO_2$, $CF_3$, or $C_{1-6}$ hydrocarbyl:

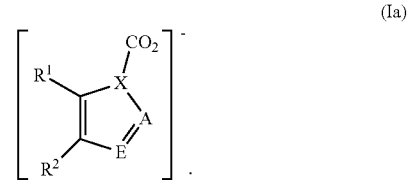

(Ia)

In certain preferred embodiments, none or one or both of $R^1$ or $R^2$ is a substituent other than H. In some preferred embodiments, $R^1$ and $R^2$ are independently H, fluoro, chloro, bromo, NO₂, CHO, or methyl. In some preferred embodiments, $C_{1-6}$ hydrocarbyl is methyl, and in others it can be methyl and/or ethyl.

In other embodiments, preferred ionic liquids comprise an anion according to formula (IIa), wherein G is CH; J is CH; and $R^7$, $R^8$, $R^9$, and $R^{10}$ are independently H, fluoro, chloro, bromo, ester, CN, CHO, NO₂, CF₃, or $C_{1-6}$ hydrocarbyl:

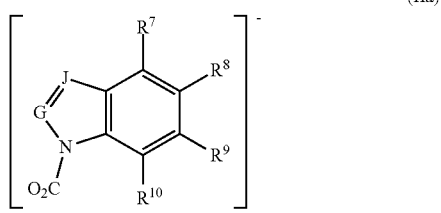

(IIa)

In certain preferred embodiments none or one of $R^7$, $R^8$, $R^9$, or $R^{10}$ is a substituent other than H. In some preferred embodiments, $R^7$, $R^8$, $R^9$, and $R^{10}$ are independently H, fluoro, chloro, bromo, NO₂, CHO, or methyl. In some preferred embodiments, $C_{1-6}$ hydrocarbyl is methyl, and in others it can be methyl and/or ethyl.

Possible cations of the ionic liquid include organic and inorganic cations. Examples of cations include quaternary nitrogen-containing cations, phosphonium cations, and sulfonium cations. Suitable cations include those disclosed in U.S. Pat. No. 7,053,232 and US Publication No. 2005/0131118, the disclosures of which are hereby incorporated by reference in their entireties. Examples of quaternary nitrogen-containing cations include, but are not limited to, cyclic, aliphatic, and aromatic quaternary nitrogen-containing cations such as n-alkyl pyridinium, a dialkyl pyrrolidinium, a dialkyl imidazolium, or an alkylammonium of the formula $R'_{4-x}NH_x$ wherein X is 0-3 and each R' is independently an alkyl group having 1 to 18 carbon atoms. In some embodiments, unsymmetrical cations may provide lower melting temperatures. Examples of phosphonium cations include, but are not limited to, cyclic, aliphatic, and aromatic phosphonium cations. For example, the phosphonium cations include those of the formula $R''_{4-x}PH_x$ wherein X is 0-3, and each R'' is an alkyl or aryl group such as an alkyl group having 1 to 18 carbon atoms or a phenyl group. Examples of sulfonium cations include, but are not limited to cyclic, aliphatic, and aromatic sulfonium cations. For example, the sulfonium cations include those of the formula $R'''_{3-x}SH_x$ wherein X is 0-2 and each R''' is an alkyl or aryl group such as an alkyl group having 1 to 18 carbon atoms or a phenyl group. Additional more specific examples may include, but are not limited to, ammonium, imidazolium, phosphonium, 1-butyl-3-methylimidazolium, 1-decyl-3-methylimidazolium, 1-dodecyl-3-methylimidazolium, 1-ethyl-3-butyl imidazolium, 1-hexyl-3-methylimidazolium, 1-hexylpyridinium, 1-methy-3-butyl imidazolium, 1-methy-3-decyl imidazolium, 1-methy-3-dodecyl imidazolium 1-methy-3-ethyl imidazolium, 1-methy-3-hexadecyl imidazolium, 1-methy-3-hexyl imidazolium, 1-methy-3-octadecyl imidazolium, 1-methy-3-octyl imidazolium, 1-methy-3-propyl imidazolium, 1-octyl-3-methylimidazolium, 1-octylpyridinium, benzyl pyridinium, N-butyl pyridinium, ethyl pyridinium, and ethylene pyridinium. Other examples of suitable cations are known in the art. For example, US2006/0197053, US2008/0028777, and US2007/0144186, all of which are incorporated by reference in their entireties, describe a number of suitable cations, and any of these cations may be used with an anion described herein.

Systems and Methods

In some embodiments, there is provided a system that provides cooling by compressing a mixture of an ionic liquid and CO₂, cooling the mixture, lowering the pressure of the mixture, and contacting an enclosed space with the mixture.

In some embodiments, the systems disclosed herein utilize a single compression device. In some embodiments, the single compression device is a co-compression device. In some embodiments, the systems disclosed herein utilize a plurality of compression devices wherein the gas and liquid are not in the same compression device. In some embodiments the compression device is designed specifically for the compounds, complexes and compositions described herein.

In some embodiments, the device has an entrance configuration to the compression step that includes a "static mixer" that maximizes the contact between the ionic liquid and CO₂ and permits the ionic liquid and CO₂ to be in close thermal equilibrium during the compression step In some embodiments, there is provided a system, that is designed to ensure that the gas to liquid ratio is optimized just before expansion. In some embodiments, the gas is substantially absorbed into the ionic liquid, so that no "extra" gas (i.e., gas that does not contribute efficiently to cooling) is pumped around the cycle. In some embodiments, the ionic liquid is substantially saturated with CO₂ just before the expansion. In some embodiments, an optimized gas to liquid ratio provides for an optimally efficient system.

As exemplified in FIG. 1, some embodiments disclosed herein provide systems which provide cooling by compressing an IL-CO₂ mixture to a designated pressure (step 3-4), cooling this mixture (4 to 5 and 5 to 6) which effects dissolution of the CO₂ in the IL and reversible chemical complexation between the IL and CO₂, lowering the pressure (6 to 1), which causes spontaneous devolving of CO₂ from the liquid phase which cools the liquid, and a heat exchange step (1 to 2) where the cold mixture is contacted with air that is inside, that it is desired to cool. In some embodiments, the systems disclosed herein may be incorporated in a refrigerator.

Some embodiments provide a IL-CO₂ co-fluid cycle which operates efficiently at lower pressures than conventional CO₂ based systems.

In some embodiments, the systems disclosed herein operate at a cold-side fluid temperature of 0 deg. C. (32 deg. F.) and a hot side temperature of at least 40 deg. C. In some embodiments, the systems disclosed herein operate at a maximum pressure of 32 ATM (450 PSI). In some embodiments, the components of the system are designed to meets these specifications. In some embodiments, the energy efficiency of the cycle is dependent upon the compression ratio that is the outlet pressure of the compressor to the inlet pressure of the compressor as the power to compress increases by a power law relation with pressure. In some embodiments, the compression ratio is from about 2:1 to 10:1. In some embodiments, the compression ratio is from about 2:1 to 5:1. In some embodiments, the compression ratio is from about 2.5:1 to 3:1.

In some embodiments, the pressure of the mixture is lowered to from 25 ATM to about 4 ATM, during expansion, including about 25 ATM to 8 ATM. In some embodiments, the extent to which the pressure is lowered during expansion is determined by the chemical properties of the fluid. In some embodiments, the low pressure is used to desorb the $CO_2$ from the ionic liquid. In some embodiments, the pressure during expansion is selected to cause the greatest possible desorption of $CO_2$ from the liquid (which is encouraged by lower pressure), while not leading to overly-large heat exchanger volumes.

In some embodiments, the expansion step generates the cooling. In some embodiments, the expansion step operates roughly between the higher and lower pressures described hereinabove.

In some embodiments, the thermodynamic change from the high pressure to the low pressure provides at least (−)12 deg. C. of temperature change for the entire mixture. In some embodiments, at least (−)12 deg. C. of temperature change is necessary for the device to be able to reach the required temperature specification.

Without being bound by any theory, it is believed that cooling efficiency is a trade-off between the heat of reaction (a larger heat of reaction absorbs more heat and provides more cooling) and the change in moles of $CO_2$ between the liquid and gas phases. A higher heat of reaction causes less $CO_2$ to uncomplex and change phase.

Figure 2:
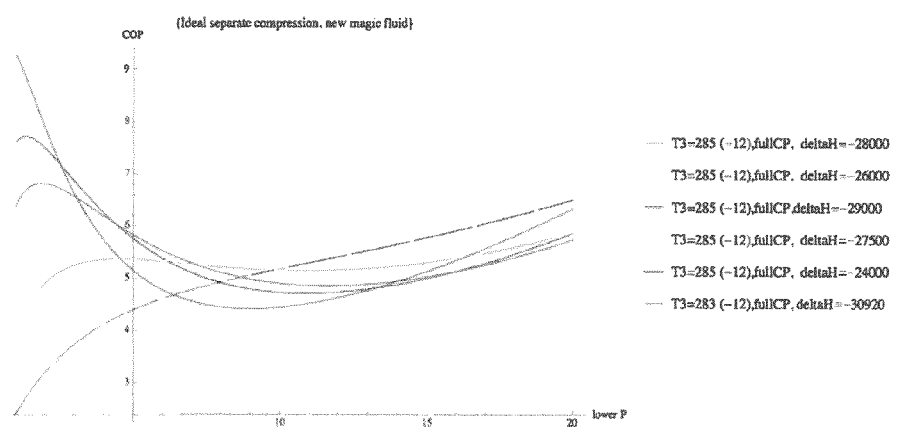
FIG. 2 depicts the Coefficient of Performance (COP) as a function of the compressor inlet pressure for fluids with different heats of reaction.
Figure 3:
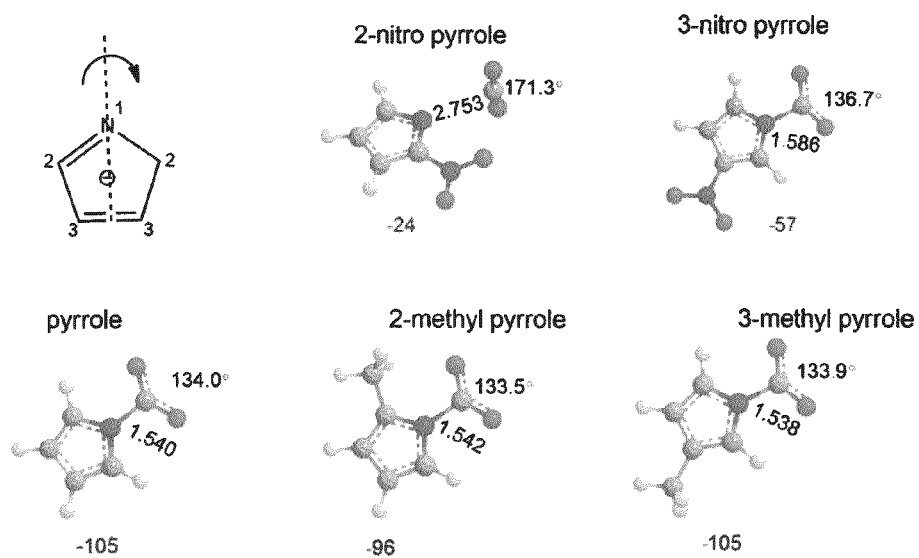
FIG. 3 depicts the Density Functional Theory (DFT) optimized geometries of selected pyrrolide compounds bound to carbon dioxide.
Figure 4:
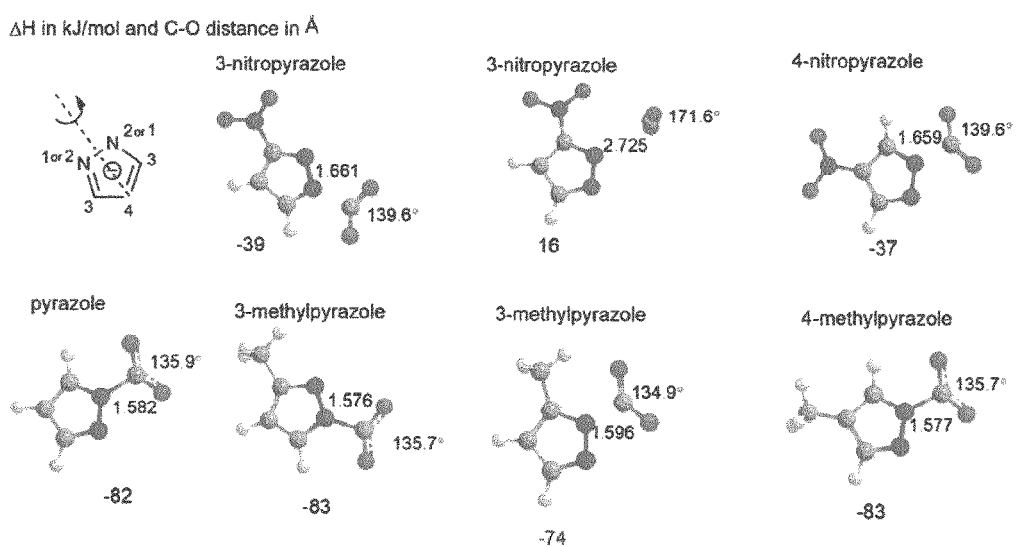
FIG. 4 depicts the DFT optimized geometries of selected pyrazolides compounds bound to carbon dioxide.

The graph depicted in FIG. 2 demonstrates that a cycle that operates with heat of reaction between (−)25 kJ/mol and (−)30 kJ/mol provides an appropriate balance between the change of moles and heat of reaction.

In some embodiments, the heat capacity of the ionic liquid impacts the thermodynamic change from the high pressure to the low-pressure stages of the cycle. In some embodiments, the necessary temperature drop is difficult to achieve when the heat capacity of the ionic liquid reaches a certain level. In some embodiments, the necessary temperature drop is difficult to achieve when the heat capacity of the ionic liquid exceeds 400 J/(mol-K). In some embodiments, the ionic liquids suitable for use in the compounds, complexes, compositions, methods or systems disclosed herein have a heat capacity of less than 400 J/(mol-K). In some embodiments, the ionic liquids suitable for use in the compounds, complexes, compositions, methods or systems have a heat capacity of less than 300 J/(mol-K).

In some embodiments, gas desorption from the ionic liquid will not occur efficiently if the viscosity of the ionic liquid is too high. In some embodiments, if the gas desorption does not occur efficiently, the cooling may not be adequate.

In some embodiments, the ionic liquids that are suitable for use in the methods and systems disclosed herein can be identified by the change in viscosity that occurs after exposure to $CO_2$. In some embodiments, the ionic liquids that are suitable for use in the methods and systems disclosed herein provide a viscosity of not greater than 400 cP at room temperature, after exposure to $CO_2$. In some embodiments, the ionic liquids that are suitable for use in the methods and systems disclosed herein provide a viscosity of not greater than 350 cP at room temperature, after exposure to $CO_2$. In some embodiments, the ionic liquids that are suitable for use in the methods and systems disclosed herein provide a viscosity of not greater than 300 cP at room temperature, after exposure to $CO_2$. In some embodiments, the ionic liquids that are suitable for use in the methods and systems disclosed herein provide a viscosity of not greater than 250 cP at room temperature, after exposure to $CO_2$. In some embodiments, the ionic liquids that are suitable for use in the methods and systems disclosed herein provide a viscosity of not greater than 200 cP at room temperature, after exposure to $CO_2$. In some embodiments, the ionic liquids that are suitable for use in the methods and systems disclosed herein provide a viscosity of not greater than 150 cP at room temperature, after exposure to $CO_2$. In some embodiments, the ionic liquids that are suitable for use in the methods and systems disclosed herein provide a viscosity of not greater than 150 cP at room temperature, after exposure to $CO_2$. In some embodiments, the ionic liquids that are suitable for use in the methods and systems disclosed herein provide a viscosity of not greater than 100 cP at room temperature, after exposure to $CO_2$. In some embodiments, the ionic liquids that are suitable for use in the methods and systems disclosed herein provide a viscosity of not greater than 75 cP at room temperature, after exposure to $CO_2$. In some embodiments, the ionic liquids that are suitable for use in the methods and systems disclosed herein provide a viscosity of not greater than 60 cP at room temperature, after exposure to $CO_2$. In some embodiments, the ionic liquids that are suitable for use in the methods and systems disclosed herein provide a viscosity of not greater than 50 cP at room temperature, after exposure to $CO_2$. In some embodiments, the ionic liquids that are suitable for use in the methods and systems disclosed herein provide a viscosity of not greater than 40 cP at room temperature, after exposure to $CO_2$.

In some embodiments, the compositions described herein further comprise an additive. In some embodiments, the additive is an agent that improves the flowability of the composition (e.g., a viscosity modifying agent). In some embodiments, the additive comprises tetraglyme.

In some embodiments, the ionic liquids that are suitable for use in the methods and systems disclosed herein do not contain an amine substituent.

The invention will be described in greater detail by way of specific examples. The following examples are offered for illustrative purposes and are not intended to limit the invention in any manner. Those skilled in the art will readily recognize a variety of noncritical parameters, which can be changed or modified to yield essentially the same results.

EXAMPLES

Ionic liquid (IL) capture of carbon dioxide is usually driven by the binding affinity of the anion for the carbon dioxide molecule. To screen for potential ionic liquids suitable for use in $CO_2$ capture, the enthalpy of $CO_2$ binding to the respective anion of the IL is calculated. For the preliminary computational calculations, a Density Functional Theory (DFT) method at PBE/aug-cc-pvtz level of theory as implemented in Gaussian 09 is used. Enthalpy of a molecule or atom at 298 K is calculated as the sum of electronic and thermal enthalpies. Taking the difference between the enthalpy of the reactants and products provides the enthalpy of a reaction. For certain ILs, the enthalpy for $CO_2$ binding is measured.

Different parent compounds may be used, including: pyrrolide, pyrazolide, imidazolide, indolide, alkoxides and carboxylates. The effects of different functional groups as substituents for these parent compounds are analyzed. The functional groups examined include nitro, cyano, fluoro, chloro, bromo, formyl, trifluoromethyl, and methyl. For certain compounds, the effect of more than one substituent on the parent compound is also calculated. The results of each parent compound and its derivatives are presented separately below in the following examples.

Example 1

Table 1 (below) describes the DFT calculated binding enthalpy of pyrrolides with carbon dioxide. There are two types of experimental values, one from isotherm plot and the other through calorimetric method. The distance between the binding nitrogen and carbon dioxide is measured in Å, which is presented in the table as N—C distance.

The data described in Table 1 demonstrates that the most stable binding energy is for the parent compound, pyrrolide, and 3-methyl pyrrolide, and the pyrrolide with least binding energy is 2-nitropyrrolide. Substitution of a methyl substituent at position 3 did not change the binding enthalpy with respect to the parent compound pyrrolide. The isomer of 3-methyl pyrrolide with the substituent at position 2 has a binding energy of −96 kJ/mol. Through-space interaction between the methyl group and $CO_2$ might be a contributing factor in the slight difference in enthalpy. Replacing the methyl group by trifluoromethyl group decreases the binding enthalpy by 30 kJ/mol for position 2 and by 51 kJ/mol for position 3. This difference is due to the varying interactions of $CO_2$ with protons and fluorine atoms in the substituents. DFT calculated enthalpy of 2-cyanopyrrolide is −45 kJ/mol, which is consistent with the isothermal and calorimetric measured values of −45 and −46 kJ/mol respectively.

TABLE 1

| Compound | Substituent position | | | | N-C distance (Å) | PBE/aug-cc-pvtz | ΔH in kJ/mol | |
| --- | --- | --- | --- | --- | --- | --- | --- | --- |
| | 2 | 3 | 4 | 5 | | | Isothermal | Calorimetric |
| Pyrrolide | H | H | H | H | 1.540 | −105 | | |
| 2-Nitropyrrolide | $NO_2$ | H | H | H | 2.753 | −24 | | |
| 3-Nitropyrrolide | H | $NO_2$ | H | H | 1.586 | −57 | | |
| 2-cyanopyrrolide | CN | H | H | H | 1.583 | −45 | −45 | −46 |
| 3-cyanopyrrolide | H | CN | H | H | 1.576 | −66 | | |
| 2-fluoropyrrolide | F | H | H | H | 1.587 | −57 | | |
| 3-fluoropyrrolide | H | F | H | H | 1.545 | −98 | | |
| 2-chloropyrrolide | Cl | H | H | H | 1.595 | −50 | | |
| 3-chloropyrrolide | H | Cl | H | H | 1.554 | −87 | | |
| 2-bromopyrrolide | Br | H | H | H | 1.593 | −47 | | |
| 3-bromopyrrolide | H | Br | H | H | 1.556 | −83 | | |
| Pyrrolide-2-carbaldehyde | CHO | H | H | H | 1.587 | −50 | | |
| Pyrrolide-3-carbaldehyde | H | CHO | H | H | 1.568 | −71 | | |
| 2-trifluoromethylpyrrolide | $CF_3$ | H | H | H | 1.599 | −44 | | |
| 3-trifluoromethylpyrrolide | H | $CF_3$ | H | H | 1.564 | −75 | | |
| 2-methylpyrrolide | $CH_3$ | H | H | H | 1.542 | −96 | | |
| 3-methylpyrrolide | H | $CH_3$ | H | H | 1.538 | −105 | | |

Example 2

Table 2 (below) describes the DFT calculated binding enthalpy of pyrazolides with carbon dioxide. There are two types of experimental values, one from isotherm plot and the other through calorimetric method. There are two binding sites for the pyrazolides with substituents at position three, and the sterically hindered binding site is labeled secondary. The distance between the binding nitrogen and carbon dioxide is measured in Å, which is presented in the table as N—C distance.

Similar to pyrrolides, pyrazolides also show the same trend in the binding enthalpy where the methyl group has the most stabilizing effect and nitro has the least stabilizing effect. The enthalpy is similar for substituents at positions 3 and 4. The only difference is when $CO_2$ binds to the secondary binding site of substituted pyrazolides at position 3, wherein the steric hindrance by the substituents has a dramatic influence on the binding energy

TABLE 2

| Compound | Substituent position | | | N-C dist. (Å) | | PBE/aug-cc-pvtz | | ΔH in kJ/mol | |
| --- | --- | --- | --- | --- | --- | --- | --- | --- | --- |
| | 3 | 4 | 5 | 1° | 2° | 1° | 2° | Isothermal | Calorimetric |
| Pyrazolide- | H | H | H | 1.582 | | −82 | | | |
| 3-nitropyrazolide | $NO_2$ | H | H | 2.725 | 1.661 | −39 | 16 | | |
| 4-nitropyrazolide | H | $NO_2$ | H | 1.659 | | −37 | | | −28 |
| 3-cyanopyrazolide | CN | H | H | 1.649 | 1.654 | −45 | −24 | | |
| 4-cyanopyrazolide | H | CN | H | 1.645 | | −44 | | | |
| 3-fluoropyrazolide | F | H | H | 1.589 | 1.654 | −74 | −40 | | |
| 4-fluoropyrazolide | H | F | H | 1.590 | | −76 | | | |
| 3-chloropyrazolide | Cl | H | H | 1.600 | 1.672 | −64 | −31 | | |
| 4-chloropyrazolide | H | Cl | H | 1.601 | | −66 | | | |

TABLE 2-continued

| Compound | Substituent position | | | N-C dist. (Å) | | PBE/aug-cc-pvtz | | Isothermal | Calorimetric |
|---|---|---|---|---|---|---|---|---|---|
| | 3 | 4 | 5 | 1° | 2° | 1° | 2° | ΔH in kJ/mol | |
| 3-bromopyrazolide | Br | H | H | 1.604 | 1.676 | −61 | −31 | | |
| 4-bromopyrazolide | H | Br | H | 1.604 | | −63 | | | |
| pyrazolide-3-carbaldehyde | CHO | H | H | 1.630 | 1.633 | −51 | −30 | | |
| pyrazolide-4-carbaldehyde | H | CHO | H | 1.639 | | −46 | | | |
| 3-trifluoromethylpyrazolide | CF$_3$ | H | H | 1.625 | 1.694 | −53 | −27 | −44 | |
| 4-trifluoromethylpyrazolide | H | CF$_3$ | H | 1.622 | | −54 | | | |
| 3-methylpyrazolide | CH$_3$ | H | H | 1.576 | 1.596 | −83 | −74 | | |
| 4-methylpyrazolide | H | CH$_3$ | H | 1.577 | | −83 | | | |

Example 3

DFT calculated binding enthalpy of imidazolides with carbon dioxide. There are two binding sites for the imidazolides with substituents at position four, and the least probable binding site due to steric hindrance is labeled secondary. The distance between the binding nitrogen and carbon dioxide is measured in Å, which is presented in the table as N—C distance.

Figure 5:
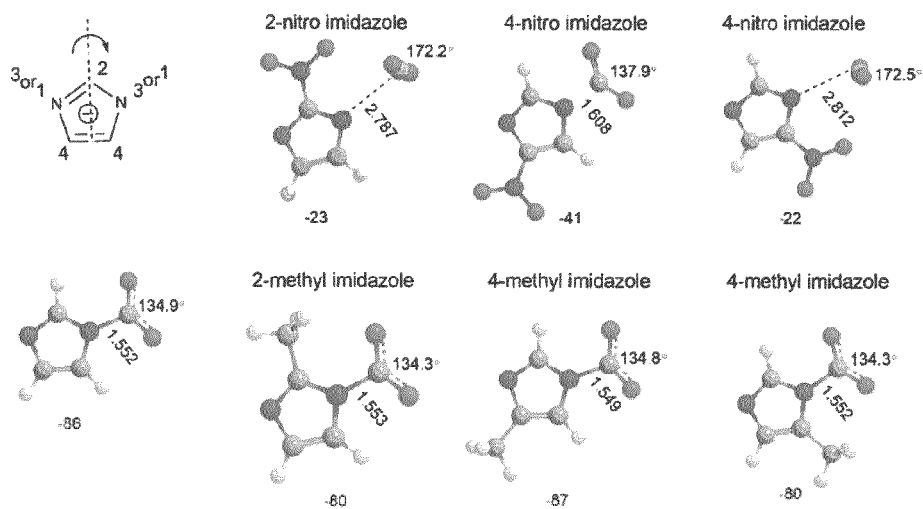
FIG. 5 depicts the DFT optimized geometries of selected imidazolides compounds bound to carbon dioxide.

In the case of imidazolides, the substitution at position 4 results in two non-equivalent binding sites for carbon dioxide, where the preferred binding site has no steric effect due to the substituents and is referred as the primary binding site. For the same substituent at positions 2 or 4 with steric hindrance, the CO$_2$ binding enthalpy is similar, but not as strongly bound (substituent at position 4, where CO$_2$ is at the 1° binding site) like the least sterically hindered complex (see, e.g., Table 3 and FIG. 5). The trend in enthalpy as a function of substituents remains similar to that of pyrrolides and pyrazolides.

Disubstituted imidazolides provide different results based on the type of substituents and their positions. For the electron withdrawing substituents, chloro or cyano the destabilization effect is more than the respective monosubstituted complex (see, e.g., FIGS. 5 and 6). The binding enthalpies for complexes 4-methyl imidazolide and 4-nitro imidazolide resulting from primary binding sites are −87 kJ/mol and −41 kJ/mol respectively. Substitution of ethyl and methyl groups at the position 2 of the respective complexes did not have much impact on the energy (see, e.g., FIG. 6). The experimentally measured value for the latter one 2-methyl, 4-nitro imidazolide is −22 kJ/mol, but the calculated value is −39 kJ/mol. This may be due to the effect of the presence of a cation and its interactions with anion and anion-CO$_2$ complex.

TABLE 3

| Compound | Substituent position | | | N-C dist. (Å) | | PBE/aug-cc-pvtz | |
|---|---|---|---|---|---|---|---|
| | 2 | 4 | 5 | 1° | 2° | 1° | 2° |
| Imidazolide | H | H | H | 1.552 | | −86 | |
| 2-nitro imidazolide | NO$_2$ | H | H | 2.787 | | −23 | |

TABLE 3-continued

| Compound | Substituent position | | | N-C dist. (Å) | | PBE/aug-cc-pvtz | |
|---|---|---|---|---|---|---|---|
| | 2 | 4 | 5 | 1° | 2° | 1° | 2° |
| 4-nitro imidazolide | H | NO$_2$ | H | 1.608 | 2.812 | −41 | −22 |
| 2-cyano imidazolide | CN | H | H | 1.619 | | −29 | |
| 4-cyano imidazolide | H | CN | H | 1.596 | 1.616 | −49 | −29 |
| 2-fluoro imidazolide | F | H | H | 1.605 | | −48 | |
| 4-fluoro imidazolide | H | F | H | 1.561 | 1.611 | −78 | −43 |
| 2-chloro imidazolide | Cl | H | H | 1.600 | | −39 | |
| 4-chloro imidazolide | H | Cl | H | 1.570 | 1.620 | −68 | −37 |
| 2-bromo imidazolide | Br | H | H | 1.622 | | −36 | |
| 4-bromo imidazolide | H | Br | H | 1.575 | 1.618 | −65 | −34 |
| imidazolide-2-carbaldehyde | CHO | H | H | 1.623 | | −35 | |
| imidazolide-4-carbaldehyde | H | CHO | H | 1.591 | 1.604 | −59 | −44 |
| 2-trifluoromethyl imidazolide | CF$_3$ | H | H | 1.645 | | −27 | |
| 4-trifluoromethyl imidazolide | H | CF$_3$ | H | 1.582 | 1.630 | −58 | −30 |
| 2-methyl imidazolide | CH$_3$ | H | H | 1.553 | | −80 | |
| 4-methyl imidazolide | H | CH$_3$ | H | 1.549 | 1.552 | −87 | −80 |

Example 4

Table 4 (below) describes the DFT calculated enthalpy of binding of indolide and its derivatives with carbon dioxide. The distance between the binding nitrogen and carbon dioxide is measured in Å, which is presented in the table as N—C distance.

Figure 7:
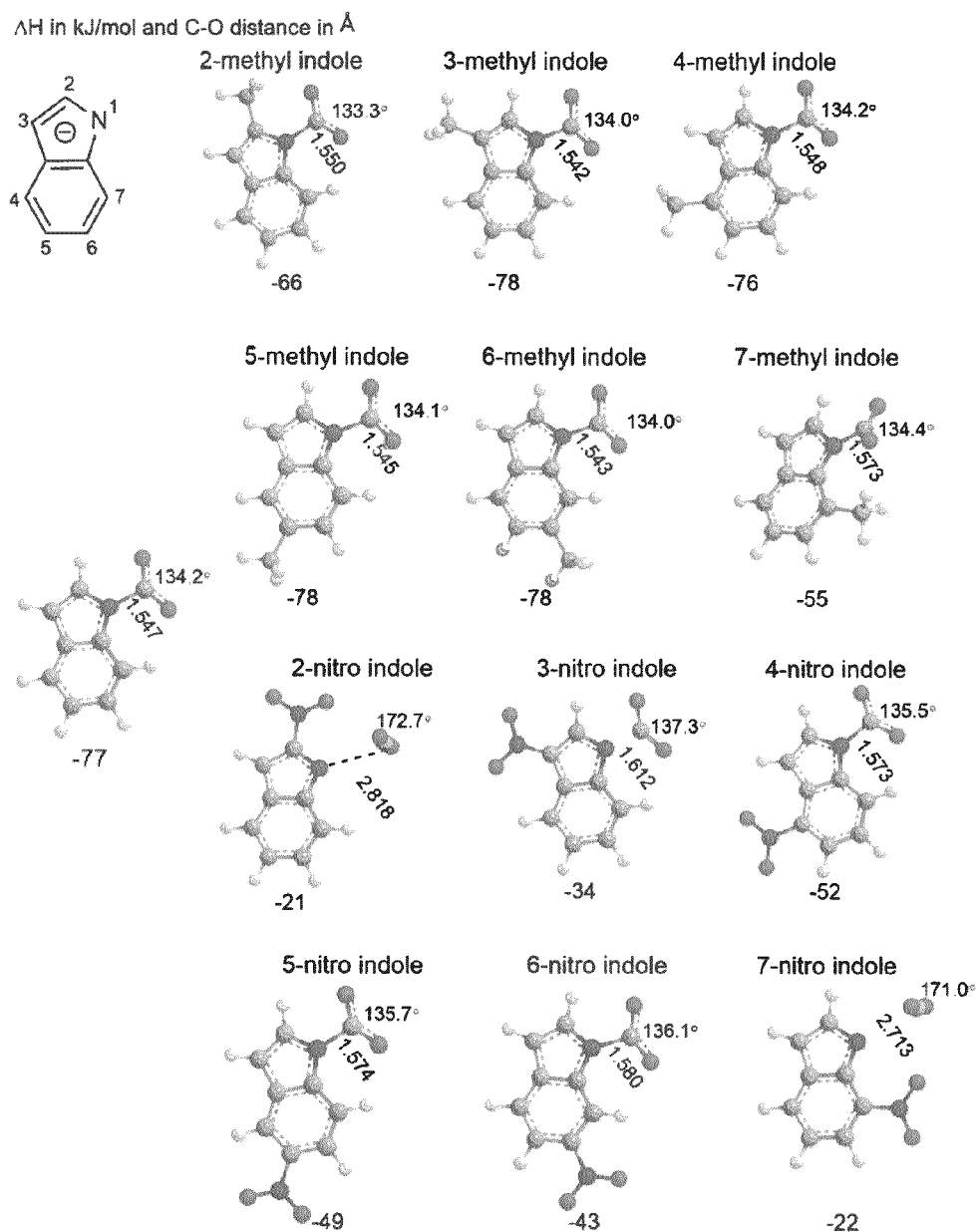
FIG. 7 depicts the DFT optimized geometries of selected indolides compounds bound to carbon dioxide.
Figure 8:
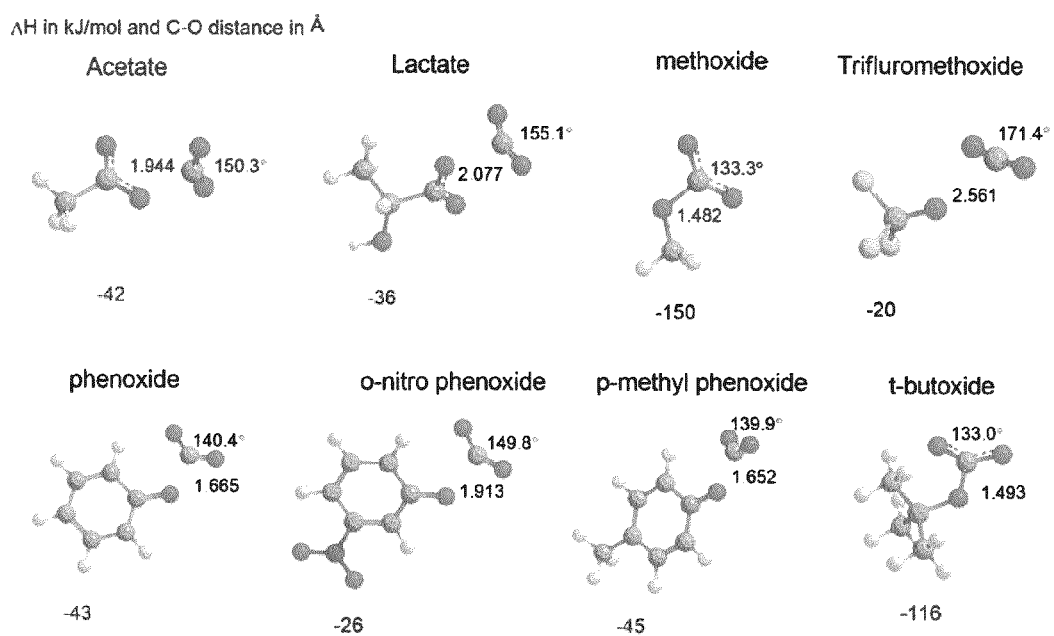
FIG. 8 depicts the DFT optimized geometries of selected carboxylate, phenoxide and alkoxide compounds bound to carbon dioxide.

Indolide has two positions that can cause steric hindrance, positions 2 and 7. (see, e.g., FIG. 7). There is virtually no binding with CO$_2$ having nitro substituents at these positions. The carbon dioxide is placed in a position perpendicular to the plane of the ring and the shape of CO$_2$ is almost linear. Similar to the 5 membered heterocyclics, the nitro group is less stabilizing and the methyl group or the parent compound has the most stable binding enthalpy.

TABLE 4

| Compound | Substituent position | | | | | | N-C dist. (Å) | ΔH in kJ/mol PBE/aug-cc-pvtz |
|---|---|---|---|---|---|---|---|---|
| | 2 | 3 | 4 | 5 | 6 | 7 | | |
| Indole | H | H | H | H | H | H | 1.547 | −77 |
| 2-intro indolide | NO$_2$ | H | H | H | H | H | 2.818 | −21 |
| 3-nitro indolide | H | NO$_2$ | H | H | H | H | 1.612 | −34 |

TABLE 4-continued

| Compound | Substituent position | | | | | N-C dist. (Å) | ΔH in kJ/mol PBE/aug-cc-pvtz |
| --- | --- | --- | --- | --- | --- | --- | --- |
| | 2 | 3 | 4 | 5 | 6 | 7 | |
| 4-nitro indolide | H | H | $NO_2$ | H | H | H | 1.573 | −52 |
| 5-nitro indolide | H | H | H | $NO_2$ | H | H | 1.574 | −49 |
| 6-nitro indolide | H | H | H | H | $NO_2$ | H | 1.580 | −43 |
| 7-nitro indolide | H | H | H | H | H | $NO_2$ | 2.713 | −22 |
| 2-cyano indolide | CN | H | H | H | H | H | 1.572 | −27 |
| 3-cyano indolide | H | CN | H | H | H | H | 1.588 | −44 |
| 4-cyano indolide | H | H | CN | H | H | H | 1.564 | −58 |
| 5-cyano indolide | H | H | H | CN | H | H | 1.567 | −56 |
| 6-cyano indolide | H | H | H | H | CN | H | 1.567 | −53 |
| 7-cyano indolide | H | H | H | H | H | CN | 1.567 | −26 |
| 2-fluoro indolide | F | H | H | H | H | H | 1.617 | −28 |
| 3-fluoro indolide | H | F | H | H | H | H | 1.549 | −71 |
| 4-fluoro indolide | H | H | F | H | H | H | 1.554 | −70 |
| 5-fluoro indolide | H | H | H | F | H | H | 1.548 | −74 |
| 6-fluoro indolide | H | H | H | H | F | H | 1.548 | −73 |
| 7-fluoro indolide | H | H | H | H | H | F | 1.604 | −43 |
| 2-chloro indolide | Cl | H | H | H | H | H | 1.618 | −22 |
| 3-chloro indolide | H | Cl | H | H | H | H | 1.559 | −63 |
| 4-chloro indolide | H | H | Cl | H | H | H | 1.564 | −66 |
| 5-chloro indolide | H | H | H | Cl | H | H | 1.552 | −69 |
| 6-chloro indolide | H | H | H | H | Cl | H | 1.553 | −67 |
| 7-chloro indolide | H | H | H | H | H | Cl | 1.651 | −26 |
| 2-bromo indolide | Br | H | H | H | H | H | 1.609 | −21 |
| 3-bromo indolide | H | Br | H | H | H | H | 1.562 | −60 |
| 4-bromo indolide | H | H | Br | H | H | H | 1.559 | −64 |
| 5-bromo indolide | H | H | H | Br | H | H | 1.554 | −67 |
| 6-bromo indolide | H | H | H | H | Br | H | 1.555 | −65 |
| 7-bromo indolide | H | H | H | H | H | Br | 1.639 | −20 |
| indolide-2-carbaldehyde | CHO | H | H | H | H | H | 1.570 | −33 |
| indolide-3-carbaldehyde | H | CHO | H | H | H | H | 1.595 | −43 |
| indolide-4-carbaldehyde | H | H | CHO | H | H | H | 1.562 | −60 |
| indolide-5-carbaldehyde | H | H | H | CHO | H | H | 1.566 | −57 |
| indolide-6-carbaldehyde | H | H | H | H | CHO | H | 1.566 | −59 |
| indolide-7-carbaldehyde | H | H | H | H | H | CHO | 1.565 | −36 |
| 2-trifluromethyl indolide | $CF_3$ | H | H | H | H | H | 1.606 | −20 |
| 3-trifluromethyl indolide | H | $CF_3$ | H | H | H | H | 1.542 | −53 |
| 4-trifluromethyl indolide | H | H | $CF_3$ | H | H | H | 1.558 | −63 |
| 5-trifluromethyl indolide | H | H | H | $CF_3$ | H | H | 1.560 | −64 |
| 6-trifluromethyl indolide | H | H | H | H | $CF_3$ | H | 1.559 | −59 |
| 7-tritluromethyl indolide | H | H | H | H | H | $CF_3$ | 1.630 | −21 |
| 2-methyl indolide | $CH_3$ | H | H | H | H | H | 1.550 | −66 |
| 3-methyl indolide | H | $CH_3$ | H | H | H | H | 1.542 | −78 |
| 4-methyl indolide | H | H | $CH_3$ | H | H | H | 1.548 | −76 |
| 5-methyl indolide | H | H | H | $CH_3$ | H | H | 1.545 | −78 |
| 6-methyl indolide | H | H | H | H | $CH_3$ | H | 1.543 | −78 |
| 7-methyl indolide | H | H | H | H | H | $CH_3$ | 1.572 | −55 |

Example 5

Table 5 (below) describes the DFT calculated enthalpy of binding of phenoxide and its derivatives with carbon dioxide. The relevant phenoxide-carbon dioxide distance is measured as the length between $O_{pheno}$—$C_{CO2}$ in Å.

Figure 6:
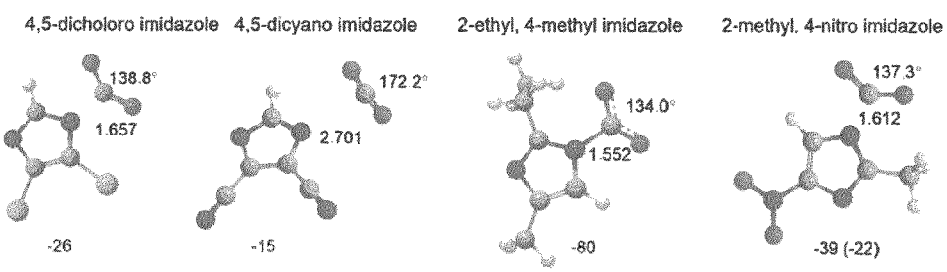
FIG. 6 depicts the DFT optimized geometries of selected disubstituted imidazolide compounds bound to carbon dioxide.

Carboxylates and alkoxides: Acetate and lactate binds $CO_2$ with an enthalpy of −42 and −36 kJ/mol respectively, and the $C_{CO2}$—$O_{carboxy}$ distance is 1.944 and 2.077 Å respectively. The bond distance, bond angle, and the enthalpy are indicators of how strong the $CO_2$ is bound to the anion. The carboxylates bind to $CO_2$ in a perpendicular fashion because the charge on the anion is delocalized and an in plane binding of $CO_2$ is not possible due to repulsion and it has to bind to one of the carboxylate oxygen atoms as shown in FIG. 6.

Alkoxides have only one binding site unlike the carboxylates. A very strong binding is seen in methoxide, where the binding enthalpy is −150 kJ/mol, but the substitution of methyl by trifluoromethyl group reduces its capacity to bind carbon dioxide (FIG. 6). Theoretically, $CO_2$ should bind more strongly to the t-butoxide, but the result shows an opposite effect. In the case of phenoxides, $CO_2$ is not bound as strongly as methoxide, at the same time it is not weak either (−43 kJ/mol). Substitution of nitro group at ortho position (−26 kJ/mol) has a destabilizing effect on the $CO_2$ binding with respect to its parent compound. Comparison of the enthalpy for methyl and cyano groups at o-, m-, and p-positions shows stabilizing and destabilizing effects respectively, and the values obtained for methyl substituents is similar to that of the parent compound, phenoxide.

TABLE 5

| Compound | Substituent position | | | | | O-C dist. (Å) | ΔH in kJ/mol PBE/aug-cc-pvtz |
| --- | --- | --- | --- | --- | --- | --- | --- |
| | 2 | 3 | 4 | 5 | 6 | | |
| phenoxide | H | H | H | H | H | 1.665 | −43 |
| o-methylphenoxide | $CH_3$ | H | H | H | H | 1.677 | −41 |
| m-methylphenoxide | H | $CH_3$ | H | H | H | 1.660 | −43 |
| p-methylphenoxide | H | H | $CH_3$ | H | H | 1.652 | −45 |
| o-fluorophenoxide | F | H | H | H | H | 1.753 | −35 |

TABLE 5-continued

| Compound | Substituent position | | | | | O-C dist. (Å) | ΔH in kJ/mol PBE/aug-cc-pvtz |
|---|---|---|---|---|---|---|---|
| | 2 | 3 | 4 | 5 | 6 | | |
| m-fluorophenoxide | H | F | H | H | H | 1.736 | −35 |
| p-fluorophenoxide | H | H | F | H | H | 1.657 | −44 |
| o-cyanophenoxide | CN | H | H | H | H | 2.381 | −22 |
| m-cyanophenoxide | H | CN | H | H | H | 1.890 | −27 |
| p-cyanophenoxide | H | H | CN | H | H | 2.342 | −23 |
| o-hydroxyphenoxide | OH | H | H | H | H | 1.484 | −42 |
| m-hydroxyphenoxide | H | OH | H | H | H | 1.690 | −39 |
| p-hydroxyphenoxide | H | H | OH | H | H | 1.628 | −50 |
| m-nitrophenoxide | H | NO$_2$ | H | H | H | 1.913 | −26 |
| 2,6-difluorophenoxide | F | H | H | H | F | 2.267 | −27 |
| 2,6-difluoro-4-methylphenoxide | F | H | CH$_3$ | H | F | 2.172 | −28 |

It is intended that any patents, patent applications or printed publications, including books, mentioned in this patent document be hereby incorporated by reference in their entirety.

As those skilled in the art will appreciate, numerous changes and modifications may be made to the embodiments described herein, without departing from the spirit of the invention. It is intended that all such variations fall within the scope of the invention.

What is claimed is:

1. A composition comprising:
   an ionic liquid; and
   carbon dioxide;
   wherein the ionic liquid has a CO$_2$ binding enthalpy of from about (−)20 kJ/mol to about (−)40 kJ/mol;
   wherein the composition is suitable for use in a vapor compression cooling or heating system; and
   wherein the ionic liquid comprises an anion selected from the group consisting of 2-nitropyrrole, 3-nitropyrazole, 4-nitropyrazole, 2-nitro imidazole, 2-cyano imidazole, 2-chloro imidazole, 2-bromo imidazole, imidazole-2-carbaldehyde, 2-trifluoromethyl imidazole, 2-nitro indolide, 3-nitro indolide, 7-nitro indolide, 2-cyano indolide, 7-cyano indolide, 2-fluoro indolide, 2-chloro indolide, 7-chloro indolide, 2-bromo indolide, 7-bromo indolide, indolide-2-carbaldehyde, indolide-7-carbaldehyde, 2-trifluromethyl indolide, 7-trifluromethyl indolide, o-fluorophenoxide, m-fluorophenoxide, o-cyanophenoxide, m-cyanophenoxide, p-cyanophenoxide, m-hydroxyphenoxide, m-nitrophenoxide, 2,6-difluorophenoxide, 2,6-difluoro-4-methylphenoxide.

2. The composition of claim 1, further comprising an additive that improves the flowability of the composition.

3. The composition of claim 2, wherein the additive comprises tetraglyme.

4. A method of cooling or heating an enclosed space comprising:
   compressing a composition comprising an ionic liquid and carbon dioxide;
   cooling said composition;
   reducing the pressure of said composition; and
   contacting the enclosed space with said composition;
   wherein the ionic liquid has a CO$_2$ binding enthalpy of from about (−)20 kJ/mol to about (−)40 kJ/mol; and
   wherein the ionic liquid comprises an anion selected from the group consisting of 2-nitropyrrole, 3-nitropyrazole, 4-nitropyrazole, 2-nitro imidazole, 2-cyano imidazole, 2-chloro imidazole, 2-bromo imidazole, imidazole-2-carbaldehyde, 2-trifluoromethyl imidazole, 2-nitro indolide, 3-nitro indolide, 7-nitro indolide, 2-cyano indolide, 7-cyano indolide, 2-fluoro indolide, 2-chloro indolide, 7-chloro indolide, 2-bromo indolide, 7-bromo indolide, indolide-2-carbaldehyde, indolide-7-carbaldehyde, 2-trifluromethyl indolide, 7-trifluromethyl indolide, o-fluorophenoxide, m-fluorophenoxide, o-cyanophenoxide, m-cyanophenoxide, p-cyanophenoxide, m-hydroxyphenoxide, m-nitrophenoxide, 2,6-difluorophenoxide, 2,6-difluoro-4-methylphenoxide.

5. The method of claim 4, wherein the composition further comprises an additive that improves the flowability of the composition.

6. The method of claim 5, wherein the additive comprises tetraglyme.

7. A system for cooling or heating an enclosed space comprising:
   a composition comprising an ionic liquid and carbon dioxide;
   a compression device;
   a means for cooling said composition;
   an expansion device; and
   a heat exchanger;
   wherein the ionic liquid has a CO$_2$ binding enthalpy of from about (−)20 kJ/mol to about (−)40 kJ/mol; and
   wherein the ionic liquid comprises an anion selected from the group consisting of 2-nitropyrrole, 3-nitropyrazole, 4-nitropyrazole, 2-nitro imidazole, 2-cyano imidazole, 2-chloro imidazole, 2-bromo imidazole, imidazole-2-carbaldehyde, 2-trifluoromethyl imidazole, 2-nitro indolide, 3-nitro indolide, 7-nitro indolide, 2-cyano indolide, 7-cyano indolide, 2-fluoro indolide, 2-chloro indolide, 7-chloro indolide, 2-bromo indolide, 7-bromo indolide, indolide-2-carbaldehyde, indolide-7-carbaldehyde, 2-trifluromethyl indolide, 7-trifluromethyl indolide, o-fluorophenoxide, m-fluorophenoxide, o-cyanophenoxide, m-cyanophenoxide, p-cyanophenoxide, m-hydroxyphenoxide, m-nitrophenoxide, 2,6-difluorophenoxide, 2,6-difluoro-4-methylphenoxide.

8. The system of claim 7, wherein the composition further comprises an additive that improves the flowability of the composition.

9. The system of claim 8, wherein the additive comprises tetraglyme.

10. The method of claim 4, wherein the ionic liquid further comprises a cation selected from the group consisting of phosphonium, ammonium, pyrrolidinium, imidazolium, and pyridinium.

11. The system of claim 7, wherein the ionic liquid further comprises a cation selected from the group consisting of phosphonium, ammonium, pyrrolidinium, imidazolium, and pyridinium.

12. The system of claim 7, further comprising a system to provide an optimized ratio of carbon dioxide to ionic liquid.

13. The composition of claim 1, wherein the ionic liquid further comprises a cation selected from the group consisting of phosphonium, ammonium, pyrrolidinium, imidazolium, and pyridinium.

* * * * *